No. 745,837. PATENTED DEC. 1, 1903.
J. J. HENDLER.
ACETYLENE GAS GENERATOR.
APPLICATION FILED DEC. 12, 1902.
NO MODEL. 2 SHEETS—SHEET 2.

Witnesses:
E. F. Wilson

Inventor:
John J. Hendler
By Rudolph Fox
Attorney

No. 745,837. Patented December 1, 1903.

UNITED STATES PATENT OFFICE.

JOHN J. HENDLER, OF CHICAGO, ILLINOIS.

ACETYLENE-GAS GENERATOR.

SPECIFICATION forming part of Letters Patent No. 745,837, dated December 1, 1903.

Application filed December 12, 1902. Serial No. 134,930. (No model.)

*To all whom it may concern:*

Be it known that I, JOHN J. HENDLER, a citizen of the United States, residing at Chicago, in the county of Cook and State of Illinois, have invented certain new and useful Improvements in Acetylene-Gas Generators; and I do hereby declare the following to be a full, clear, and exact description of the invention, such as will enable others skilled in the art to which it appertains to make and use the same.

My invention relates to a novel construction in an apparatus for generating acetylene or similar gases, the object being to provide a generator which is simple and efficient and which is particularly adapted for use where it is subjected to a great deal of jolting, as on cars and other vehicles, and which can advantageously be constructed for large or small capacity, and particularly in portable sizes; and it consists in the features of construction and combinations of parts hereinafter fully described and claimed.

Figure 1:
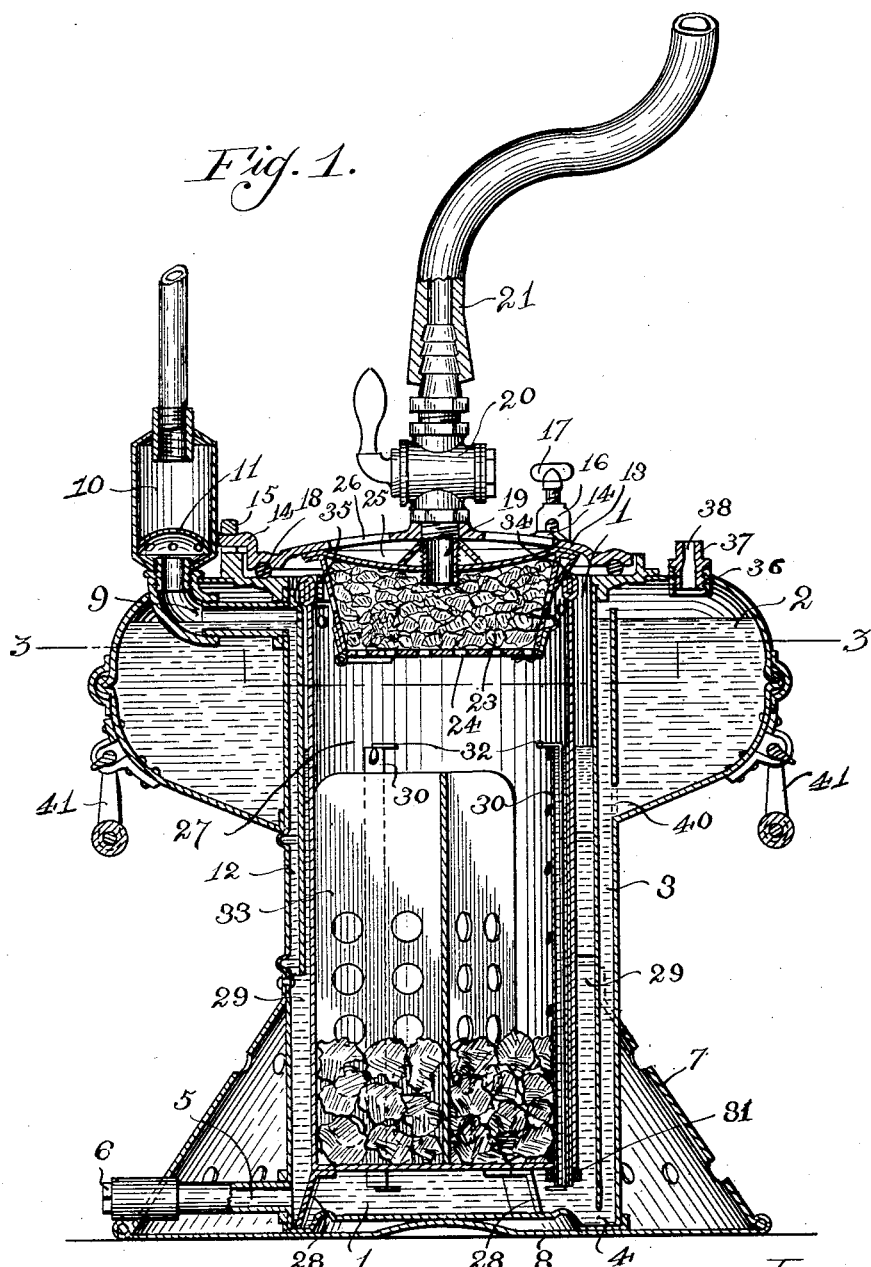
Figure 2:
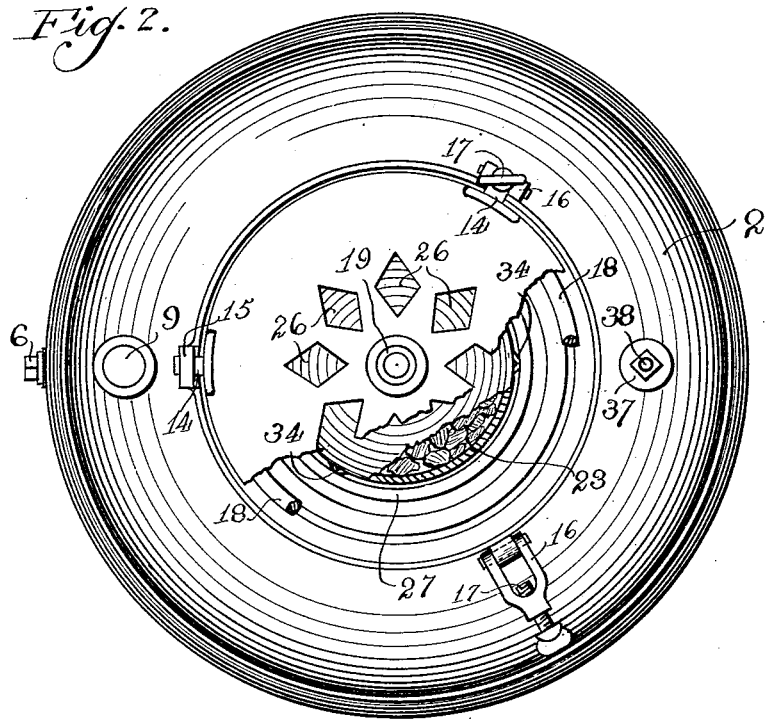
Figure 3:
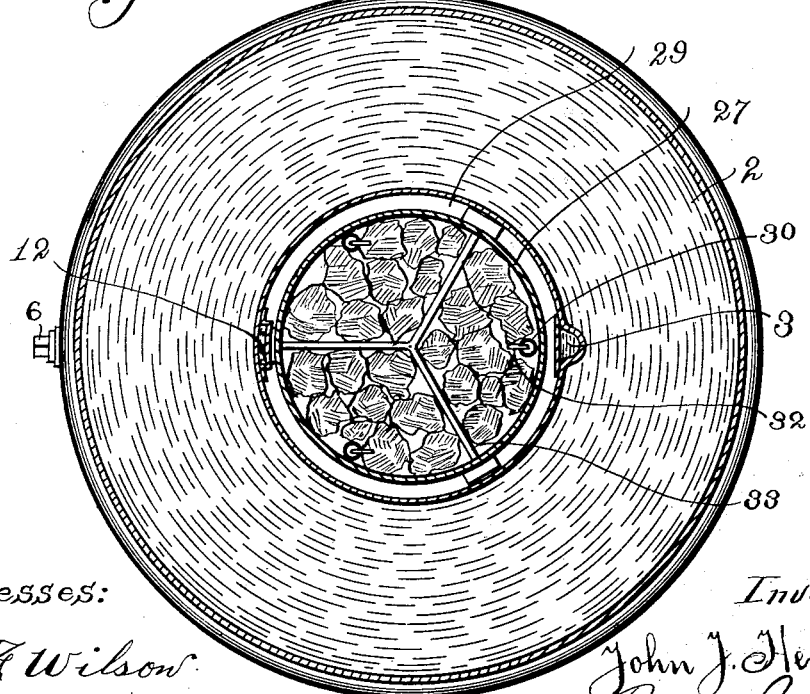

In the accompanying drawings, illustrating my invention, Figure 1 is a central section of a generator constructed in accordance with my invention. Fig. 2 is a top plan view of my generator, the valve controlling the gas-outlet being removed. Fig. 3 is a transverse section of the same on the line 3 3 of Fig. 1.

My said generator is of that type in which the water is fed to the calcium carbid, as distinguished from that type in which the carbid is fed to an excess of water.

The generator consists of a central cylindrical chamber 1, open at its upper end. The said chamber 1 is surrounded at its upper end with an annular water-reservoir 2, which is connected by means of a vertical duct 3 with the lower end of said chamber 1, the latter being provided at its lower end, just above the bottom, with an opening 4, communicating with said duct 3. Leading from said lower end of said chamber 1 is a water-outlet 5, closed by means of a plug 6, through which the water contained in said chambers 1 and 2 can be drained off. Secured to and surrounding the lower end portion of said chamber 1 is an inverted-funnel-shaped perforated sheet-metal base 7, having a bottom 8, which serves to more firmly support the generator to prevent tipping thereof. Leading from the upper end of said chamber 1 is a blow-off pipe 9, which passes partly through and emerges from the top of said annular water-chamber 2 and is enlarged immediately above the latter, as at 10, said enlarged portion 10 being provided with a perforated plate 11 in its lower end, against which water thrown up by escaping gas impinges and is prevented from passing. A vertical duct 12 leads from the mouth of said blow-off pipe 9 to a point below the middle of said chamber 1, the escaping gas being obliged to enter the lower end of said duct 12 in order to pass out through said pipe 9. The said chamber 1 is closed by means of a cover 13 fitting over same and which is secured in place by means of a plurality of lugs 14, one of which enters an opening in a projection 15 on the wall of the chamber 2 and the others of which are received in pivoted clamps 16 and engaged by set-screws 17 in said clamps, and thereby forced down to compress a rubber washer 18, interposed between said cover 13 and the upper wall of said chamber 2, thereby forming a gas-tight joint between the chamber 1 and said cover 13. Secured to the said cover 13 is a gas-delivery pipe 19, controlled by a valve 20 and connected, by means of a flexible pipe 21, with a purifier. To the lower face of said cover 13 is secured a receptacle 23, adapted to receive a gas scrubbing and drying material, which is introduced through a hinged gate 24 on the lower end of said receptacle, said gate being perforated to readily admit the gas. The said pipe 19 enters said receptacle at its upper end. A space 25 is preferably left between the upper wall of said receptacle 23 and said cover 13, to which air is admitted through perforations 26 in said cover. The said chamber 1 receives a cylindrical carbid-receptacle 27, which is open at the top and provided on its bottom with supporting-legs 28. The said receptacle 27 is of smaller diameter than the chamber 1, so as to provide an annular water-chamber 29 between the same, the water contained in same serving to keep the contents of said receptacle cool. One or more pipes or ducts 30 lead from the bottom of said receptacle 27 to a point within said receptacle at a predetermined distance below the normal water-level in said reservoir 2 and form the water-inlets into said receptacle. The pipe or pipes 30 are preferably vertically adjustable in height by means of nuts 31, engaging the lower screw-threaded ends of said pipes 30, and which are revolubly secured to the bottom of said chamber 1, the joints between said pipes 30 and the bottom of said receptacle 27 being suitably packed to prevent leakage. In each of said pipes 30 a wire 32 is inserted, the projecting ends of which are looped to prevent removal, said wires 32 serving as a means for cleaning said pipes and also to reduce the flow of water therethrough. Within said receptacle 27, which forms the generating-chamber, is a tripod or spider 33, composed of three perforated plates of sheet metal, which serves to divide said receptacle into three parts, each of which contains carbid and each of which is fed by one of said pipes 30. The said tripod or spider 33 serves only to hold the carbid bodies separate and provide better facilities for the expansion of the refuse resulting from its decomposition and, further, to render removal of such refuse easier. The said tripod is not essential to the operation of the generator and may be omitted. At its upper end said receptacle 27 is provided with perforations, through which communication between the same and the chamber 1 is established above the water-level in the latter. These perforations are not essential, for the reason that no tight joint is formed between the upper end of said receptacle 27 and said cover or the outer wall of the receptacle 23, which projects into the said receptacle 27. In order to hold the latter concentric with the chamber 1, the legs 28 thereof are inclined outwardly, so as to come in contact with the inner wall of the chamber 1, and on the outer wall of the receptacle 23 I provide a plurality of inclined sheet-metal projections 34, which engage the inner edge of the upper end of the receptacle 27 and serve the double purpose of centering same relatively to the chamber 1 and holding said receptacle firmly down in the latter to prevent it from floating.

The operation of my generator is as follows: All reservoirs or receptacles being empty, the receptacle 27 (which is provided with a bail 35) is partially filled with the requisite charge of carbid (preferably in lumps), and is then inserted in the chamber 1 and the cover 13 secured in place thereon, the valve 20 being closed. The reservoir 2 is then completely filled to overflowing with water through the inlet 36, which is closed by means of a plug 37, provided with an air-vent 38. When said reservoir 2 has been so filled, the valve 20 (and such other valves as may be requisite to establish communication with the outer air through one or more burners) is opened, whereupon the water will rise in the annular chamber 29 and likewise in the pipe or pipes 30 until it flows out of the tops of the latter and trickles down same in drops, as indicated by the black dots in Fig. 1. As soon as this water comes in contact with the carbid gas is generated, which causes an increase in the pressure in chamber 1 and forces the water in chamber 29 downwardly and stops the flow upon the carbid. When the pressure again recedes, the flow on the carbid is repeated, such action continuing at intervals, depending upon the capacity of the outlets. The air contained in the chamber 1 and the service-pipes is thus exhausted and replaced by gas, which is ignited at the burner or burners as soon as sufficient air has been exhausted. The gas-pressure is determined by the difference between the height of the water-level in the reservoir 2 and that in the chamber 29, the maximum height of the level in the latter being determined by the height of the pipes 30, so that the normal working pressure is equal to the difference between the height of the pipes 30 and the water-level in the reservoir 2; but such pressure is obviously constantly varied to a slight degree. As soon as the valve 20 is opened the water-level in the reservoir 2 obviously sinks, for the reason that the chamber 29 is filled therefrom, and thereafter remains substantially as shown in Fig. 1. If at any time a superabundance of gas is generated—as, for instance, by suddenly reducing the consumption by extinguishing a number of or all burners at once—such gas will force down the water-level in chamber 29 until the lower end of the duct 12, leading to the blow-off, is uncovered, whereupon the excess gas will obviously escape. The water-level in the blow-off will obviously coincide with that in the reservoir, and the excess gas in escaping must bubble up through the water. This will sometimes cause the water to be forced up into the enlarged portion 10 of the blow-off where it strikes the plate 11 and is divided to allow the gas to pass through the perforations in said plate. In order to make the escape of gas through said blow-off difficult, I have so arranged the duct 3 that it extends above the normal water-level in the reservoir 2 and provide an opening 40 in said duct 3 at the bottom of said reservoir 2. Thus if at any time there is a sudden rise in gas-pressure the water in being forced out of the chamber 29 cannot readily flow back into the reservoir 2 through said opening 40, and hence a part of such water will be forced to overflow the upper end of said duct 3. This will of course cause resistance against release of such pressure, and by hindering rapid release the consumption at the burners will be momentarily increased, thereby consuming as much of the excess gas as possible and preventing its escape through the blow-off. After the carbid is entirely or almost entirely decomposed the receptacle 27 will obviously be flooded and every particle of the carbid used. The water surrounding the generating-chamber absorbs the heat liberated during generation and prevents freezing in case of exposure of the generation, thus rendering the same better fitted for use on vehicles, cars, and in exposed places than generators of other types. Jolting does not affect the generator to cause excess generation and does not affect the uniformity and steadiness of the light in any manner. Removal of the cover 13 while the generator is in operation causes immediate extinction of the lights and causes the receptacle 27 to float in the chamber 1, and thus prevents access of water thereto, so that the generator is perfectly safe at all times. The water remains perfectly clear and free from residuum, and, owing to the very small surface exposed to the action of the gas, such water absorbs only very little, and hence there is no waste from this source.

In order to facilitate handling of the generator, I provide handles 41 thereon, which are pivotally secured at diametrically opposite points to the walls of water-reservoir 2.

I claim as my invention—

1. In an acetylene-gas generator, the combination with a chamber open at its upper end, a water-reservoir adjacent the upper end and outside of said chamber, connection between said water-reservoir and the lower end of said chamber, means for sealing said chamber, and a gas-outlet therefrom, of a removable carbid-receptacle adapted to enter said chamber, tubes carried by said receptacle and leading from the bottom thereof and discharging in the end thereof and forming a water connection between said chamber and receptacle, and connection between the upper ends of said chamber and receptacle above the normal water-level in the former.

2. In an acetylene-gas generator, the combination with a chamber open at its upper end, a water-reservoir adjacent the upper end and outside of said chamber, connection between said water-reservoir and the lower end of said chamber, means for sealing said chamber, and a gas-outlet therefrom, of a carbid-receptacle adapted to enter said chamber, tubes leading from the bottom of said receptacle to a point above the level of the carbid therein and forming a water connection between said chamber and receptacle, connection between the upper ends of said chamber and receptacle above the normal water-level in the former, and connection between said chamber and a gas-escape pipe below the normal water-level in said chamber.

3. In an acetylene-gas generator, the combination with a chamber open at its upper end, a water-reservoir outside of and adjacent the upper end of said chamber, connection between said water-reservoir and the lower end of said chamber, a cover for sealing said chamber, and a gas-outlet therefrom, of a carbid-receptacle closed at its lower end and open at its upper end adapted to fit loosely within said chamber and be surrounded by the water therein, water-feed connection between said carbid-receptacle and said chamber above the level of carbid in said receptacle, gas connection between the upper ends of said receptacle and said chamber, and means for vertically adjusting said water connection between said chamber and said receptacle.

4. In an acetylene-gas generator, the combination with a chamber open at its upper end, a water-reservoir outside of and adjacent the upper end of said chamber, connection between said water-reservoir and the lower end of said chamber, a cover for sealing said chamber, and a gas-outlet therefrom, of a carbid-receptacle closed at its lower end and open at its upper end adapted to fit loosely within said chamber and be surrounded by the water therein, water-feed connection between said carbid-receptacle and said chamber above the level of carbid in said receptacle, gas connection between the upper ends of said receptacle and said chamber, means for vertically adjusting said water connection between said chamber and said receptacle to vary the gas-pressure, and connection between said chamber and a blow-off below the water connection between said chamber and receptacle.

5. In an acetylene-gas generator, the combination with a chamber open at its upper end, a water-reservoir surrounding said chamber at its upper end, connection between said water-reservoir and the lower end of said chamber by means of a duct having openings above and below the normal water-level in said reservoir, a cover for sealing said chamber, and a gas-outlet therefrom, of a carbid-receptacle adapted to fit loosely within said chamber, water-feed connection between said chamber and said receptacle above the level of the carbid in the latter and below the normal water-level in the former, and gas connection between said receptacle and said chamber above the normal water-level in the latter.

6. In an acetylene-gas generator, the combination with a chamber open at its upper end, a water-reservoir surrounding said chamber at its upper end, connection between said water-reservoir and the lower end of said chamber by means of a duct having openings above and below the normal water-level in said reservoir, a cover for sealing said chamber, and a gas-outlet therefrom, of a carbid-receptacle adapted to fit loosely within said chamber, water-feed connection between said chamber and said receptacle above the level of the carbid in the latter and below the normal water-level in the former, gas connection between said receptacle and said chamber above the normal water-level in the latter, and connection between said chamber and a blow-off below the water connection between said chamber and said receptacle.

7. In an acetylene-gas generator, the combination with a chamber open at its upper end, a water-reservoir surrounding said chamber at its upper end, a vertical duct leading from a point within and above the water-level in said reservoir to the lower end of said chamber, a small opening in said duct at the bottom of said reservoir, a cover for sealing said chamber, and a gas-outlet therefrom, of a carbid-receptacle adapted to be centrally supported in said chamber and surrounded by the water therein, water-feed connection between said chamber and said receptacle above the level of the carbid in the latter and below the water-level in said reservoir, gas connection between the upper ends of said receptacle and said chamber, and means for vertically adjusting the said water-feed connection, whereby the normal gas-pressure is varied.

8. In an acetylene-gas generator, the combination with a chamber open at its upper end, a water-reservoir surrounding said chamber at its upper end, a vertical duct leading from a point within and above the water-level in said reservoir to the lower end of said chamber, a small opening in said duct at the bottom of said reservoir, a cover for sealing said chamber, and a gas-outlet therefrom, of a carbid-receptacle adapted to be centrally supported in said chamber and surrounded by the water therein, water-feed connection between said chamber and said receptacle above the level of the carbid in the latter and below the water-level in said reservoir, gas connection between the upper ends of said receptacle and said chamber, means for vertically adjusting the said water-feed connection, whereby the normal gas-pressure may be varied, and a vertical blow-off having connection at its lower end with said chamber below said water-feed connection between the latter and said receptacle.

9. In an acetylene-gas generator, the combination with a central cylindrical chamber open at its upper end, a water-reservoir surrounding said chamber at its upper end, connection between said water-reservoir and the lower end of said chamber, a cover for sealing said chamber, and a gas-outlet therefrom, of a cylindrical carbid-receptacle open at its upper end adapted to be supported concentrically within said chamber and above the bottom thereof, vertically-adjustable tubes leading from the space below said receptacle into latter and terminating at points above the carbid-level therein and below the water-level in said reservoir, and gas connection between the upper ends of said receptacle and said chamber.

10. In an acetylene-gas generator, the combination with a central cylindrical chamber open at its upper end, a water-reservoir surrounding said chamber at its upper end, connection between said water-reservoir and the lower end of said chamber, a cover for sealing said chamber, and a gas-outlet therefrom, of a cylindrical carbid-receptacle open at its upper end adapted to be supported concentrically within said chamber and above the bottom thereof, vertically-adjustable tubes leading from the space below said receptacle into latter and terminating at points above the carbid-level therein and below the water-level in said reservoir, gas connection between the upper end of said chamber and receptacle, and connection between said chamber and a blow-off below the level of the upper ends of said tubes.

11. In an acetylene-gas generator, the combination with a cylindrical chamber open at its upper end, a water-reservoir adjacent the upper end of said chamber, a duct leading from a point within and above the water-level of said reservoir to the lower end of said chamber, a small opening in said duct below the water-level of said reservoir, means for sealing said chamber, and a gas-outlet therefrom, of a cylindrical carbid-receptacle adapted to be supported concentrically within said chamber above the bottom thereof, a vertically-adjustable tube passing through the bottom of said receptacle and forming a water-inlet into said receptacle above the level of the carbid therein, and below the water-level in said reservoir, gas connection between the upper end of said receptacle and said chamber, and a blow-off leading from said chamber at a point below the outlet end of said tube, the generation of gas being adapted to maintain the water-level in said chamber normally on a level with the outlet end of said tube, excessive generation being adapted to force said water back into the reservoir, such passage being resisted by the small opening in said duct, thereby preventing rapid release of the excess pressure and preventing superfluous waste through the blow-off.

In testimony whereof I affix my signature in presence of two witnesses.

JOHN J. HENDLER.

Witnesses:
 RUDOLPH WM. LOTZ,
 WM. B. SNOWHOOK.